United States Patent [19]

Yokoyama et al.

[11] 4,169,028
[45] Sep. 25, 1979

[54] CATHODIC PROTECTION

[75] Inventors: Isao Yokoyama; Motohiko Makino, both of Nikako; Shunjiro Saito, Funabashi; Mitsunobu Yokoyama, Ichikawa; Haruo Miyama, Funabushi; Syun Awaji, Nikaho, all of Japan

[73] Assignee: TDK Electronics Co., Ltd., Tokyo, Japan

[21] Appl. No.: 902,393

[22] Filed: May 3, 1978

Related U.S. Application Data

[63] Continuation-in-part of Ser. No. 619,078, Oct. 2, 1975, abandoned.

[30] Foreign Application Priority Data

Oct. 23, 1974 [JP] Japan .................................. 49-122120

[51] Int. Cl.$^2$ ............................................. C23F 13/00
[52] U.S. Cl. ............................. 204/147; 204/196; 204/291; 252/62.56; 252/62.6; 252/62.62
[58] Field of Search ............... 204/147, 196, 290 F, 204/291; 429/45, 221; 252/62.56, 62.6, 62.62

[56] References Cited

U.S. PATENT DOCUMENTS

| | | | |
|---|---|---|---|
| 3,066,103 | 11/1962 | Owen | 252/62.56 |
| 3,234,136 | 2/1966 | Ahn et al. | 252/62.56 |
| 3,236,777 | 2/1966 | Im et al. | 252/62.56 |
| 3,294,667 | 12/1966 | Giuffrida | 204/196 |
| 3,375,195 | 3/1968 | Brockman et al. | 252/62.56 |
| 3,914,181 | 10/1975 | Berg et al. | 252/62.56 |

OTHER PUBLICATIONS

Itai et al., "J. Electrochemical Soc.", Oct., 1971, pp. 1709-1711.

*Primary Examiner*—T. Tung
*Attorney, Agent, or Firm*—Burgess, Ryan and Wayne

[57] ABSTRACT

An electrode for use in electric prevention for corrosion, the electrode comprising a sintered body of a mixture of iron oxide of 90 to 55 mol % in terms of $Fe_2O_3$ and a metal oxide of 10 to 45 mol % in terms of MO (M is at least one metal selected from the group consisting of Mn, Ni, Co, Cu and Zn), and a process of electric prevention for corrosion by using said electrode as an anode.

12 Claims, 1 Drawing Figure

CATHODIC PROTECTION

This application is a continuation-in-part of application Ser. No. 619,078, filed Oct. 2, 1975, and now abandoned.

BACKGROUND OF THE INVENTION

It is well known that a metallic vessel such as an iron vessel containing water having electrolytes dissolved therein as, for example, seawater, corrodes gradually, and in order to prevent the corrosion of such a vessel, an electric means is used, which is called "electric prevention for corrosion". The electric prevention for corrosion is also called "cathodic protection". In such electric prevention, a metallic vessel is used as a cathode and carbon, magnetite or a platinum-coated-titanium electrode is used as an anode, and a D.C. voltage is applied to the electrodes. In this case, an electrode which is used as an anode is required to have good corrosion resistance. In addition to this, in order to prevent the corrosion of "iron vessel for heating water", or "iron water heater" by the cathodic protection method, an electrode which is used as an anode is required to have good thermal shock resistance as well as good corrosion resistance because heating and cooling are repeated in the water heater.

It has been ground that the carbon electrode is characterized by poor corrosion resistance, and the magnetite electrode is characterized by poor corrosion resistance and thermal shock resistance. The platinum-coated-titanium electrode is excellent in electric conductivity and thermal shock resistance but it has low resistance for ripple current.

It is an object of the present invention to provide an electrode which is excellent in thermal shock resistance as well as the corrosion resistance and further, has a lower resistivity.

SUMMARY OF THE INVENTION

The present invention relates to an electrode for use in electric prevention for corrosion and to a process of electric prevention for corrosion by using said electrode.

The electrode of the present invention comprises a sintered body of a mixture of iron oxide of 90 to 55 mol % in terms of $Fe_2O_3$ and a metal oxide of 10 to 45 mol % in terms of MO (M is at least one metal selected from the group consisting of Mn, Ni, Co, Cu and Zn). The sintered body is a solid solution of $MFe_2O_4$ (wherein M is as defined above) of 15.79 to 87.1 mol % and $Fe_3O_4$ of 84.21 to 12.9 mol %. In the sintered body, iron atoms are present in both the "ferric" and "ferrous" forms. Accordingly, the expression "in terms of" means that "all iron oxides present in the sintered body are calculated in the form of $Fe_2O_3$".

Electrodes of the present invention may be manufactured for example, as follows:

Ferric oxide ($Fe_2O_3$) and a metal oxide (MnO, NiO, CoO, CuO, or ZnO), in a ratio of 90 to 55 mol % to 10 to 45 mol % are mixed in a ball mill. The mixture is heated for about 1 to about 15 hours in air, nitrogen, or carbon dioxide, at a temperature of about 700° to about 1000° C. Hydrogen may be present in an amount up to about 10% in nitrogen gas. After cooling, the heated mixture is pulverized to obtain a fine powder. The fine powder is formed into a shaped body, for example, by compression molding or extrusion. The shaped body is heated at a temperature of about 1100° to about 1450° C. in nitrogen or carbon dioxide containing up to about 20% by volume of oxygen, for about 1 to about 4 hours. The heated body is then slowly cooled in nitrogen or carbon dioxide containing up to about 5% by volume of oxygen. The desired sintered body, i.e., an electrode of the present invention is obtained. The electrodes thus produced have relatively low resistivity, good corrosion resistance and thermal shock resistance.

Instead of $Fe_2O_3$, metal iron or FeO may be used. Instead of the metal oxide, compounds of the metals which produce the metal oxides on heating may be used, for example, the metal carbonate or oxalate.

DESCRIPTION OF THE PREFERRED EMBODIMENTS

Figure 1:
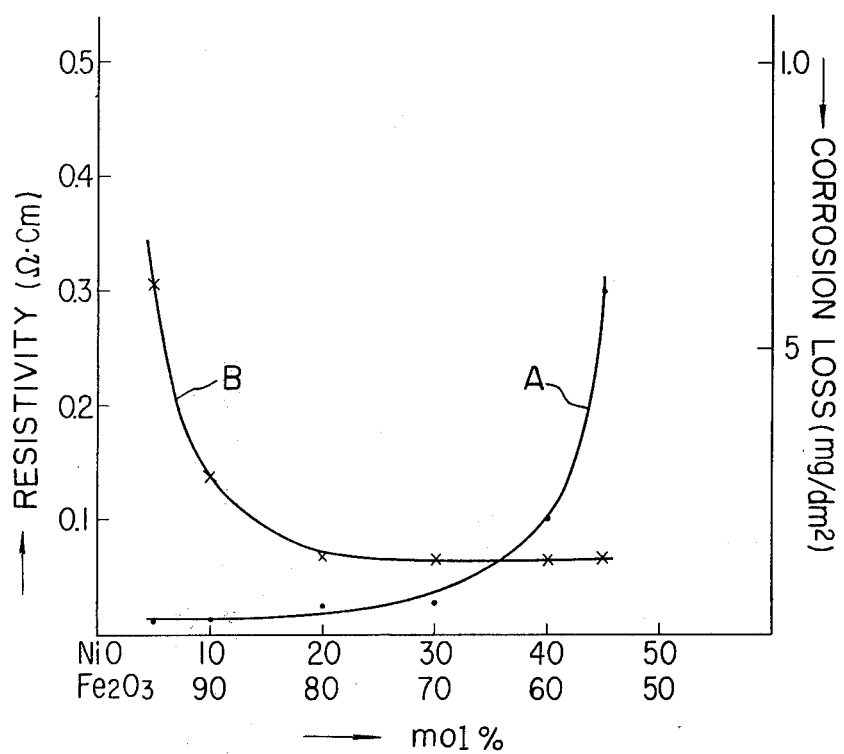

The following examples are given by way of illustration only:

EXAMPLE 1

As shown in Table 1.1, $Fe_2O_3$ and NiO were each weighed out to provide Samples Nos. 1-6 containing various molar percentages of $Fe_2O_3$ and NiO.

Table 1.1

| Sample No. | $Fe_2O_3$: NiO (mol %) | $Fe_2O_3$ (g) | NiO (g) |
|---|---|---|---|
| 1 | 95 : 5 | 195.18 | 4.82 |
| 2 | 90 : 10 | 190.12 | 9.88 |
| 3 | 80 : 20 | 179.06 | 20.94 |
| 4 | 70 : 30 | 166.60 | 33.40 |
| 5 | 60 : 40 | 152.46 | 47.54 |
| 6 | 55 : 45 | 144.64 | 55.36 |

In each case, $Fe_2O_3$ and NiO were mixed in a ball mill for 20 hours. The mixtures were then pre-heated at a temperature of 800° C. for about 3 hours and then cooled. The resulting mixtures were pulverized using a ball mill to obtain powders having a particle size of less than 20 microns. The powders were compression molded at about 1 ton/cm² to form shaped bodies 110 mm × 15 mm × 15 mm. The shaped bodies were heated for 5 hours at a temperature of 1440° C. in nitrogen gas, and then slowly cooled in nitrogen gas over a period of 10 hours to obtain the desired sintered bodies, i.e., electrodes.

The resistivities of the sintered bodies (Electrodes Nos. 1-6) obtained were measured by the four contact method. The values obtained are shown in Table 1.2. The corrosion resistance of each sintered body (i.e., the anodes) was evaluated by measuring the loss in weight of each anode in the electrolysis of the standard seawater under the following conditions. The values obtained are shown as "corrosion loss" in Table 1.2.

| Conditions of electrolysis: | |
|---|---|
| Anode area | 0.25 dm² |
| Cathode platinum net | 100 mm × 200 mm × 1.0 mm |
| Space between the electrodes | 5 cm |
| Voltage (D.C.) | 10 V |
| Current density | 5 Amp/dm² |
| Temperature of solution | 30° C. ± 1 |
| Duration of electrolysis | 4 hours |

The thermal shock resistance of each sintered body (i.e., the anodes) was evaluated by counting the number of repetitions of "heating" and "cooling" as follows:

The sintered body is dipped in hot water at a temperature of 98° C. for 3 minutes and then dipped in cold water at a temperature of 5° C. for 3 minutes. This "heating and cooling" (referred to as one cycle of heating and cooling) is repeated until the sintered body breaks down. The number of repetitions obtained are shown in Table 1.2.

Table - 1.2

| Sample No. | Resistivity (Ω·cm) | Corrosion loss (mg/dm$^2$) | Number of repetition of heating and cooling |
|---|---|---|---|
| 1 | 0.01 | 6.10 | 165 |
| 2 | 0.01 | 2.70 | 205 |
| 3 | 0.05 | 1.35 | 225 |
| 4 | 0.05 | 1.35 | 230 |
| 5 | 0.10 | 1.35 | 240 |
| 6 | 0.30 | 1.35 | 250 |

As seen from the results shown above, Sample 1 has a low resistivity, but it is inferior in both corrosion resistance and thermal shock resistance.

In FIG. 1 of the accompanying drawings, Curves A and B respectively show the variation in resistivity and corrosion loss with variations in the relative molar percentages of $Fe_2O_3$ and NiO.

EXAMPLE 2

As shown in Table 2.1, $Fe_2O_3$, MnO, CoO, CuO, ZnO and NiO were each weighed out to provide Samples Nos. 7-14 containing various molar percentages of $Fe_2O_3$, MnO, CoO, CuO, ZnO and NiO.

Table 2.1

| Sample No. | $Fe_2O_3$ mol % (g) | MnO mol % (g) | CoO mol % (g) | CuO mol % (g) | ZnO mol % (g) | NiO mol % (g) |
|---|---|---|---|---|---|---|
| 7 | 90 (190.59) | 10 (9.41) | | | | |
| 8 | 90 (190.09) | | 10 (9.91) | | | |
| 9 | 90 (189.51) | | | 10 (10.49) | | |
| 10 | 90 (189.28) | | | | | 10 (10.72) |
| 11 | 60 (152.34) | | 40 (47.66) | | | |
| 12 | 60 (151.66) | 10 (11.23) | 15 (17.79) | | 15 (19.32) | |
| 13 | 60 (151.29) | | | 20 (25.12) | | 20 (23.59) |
| 14 | 60 (152.32) | 10 (11.28) | | 10 (12.64) | | 20 (23.75) |

The sintered bodies (Electrodes Nos. 7-14) were obtained by the same procedure as that of Example 1 except that "pre-heating" and "heating" were carried out under the conditions as shown in Table 2.2.

Table 2.2

| Sample No. | Preheating Temperature (°C.) | Atmosphere | Time (Hour) | Heating Temperature (°C.) |
|---|---|---|---|---|
| 7 | 800 | $N_2$ containing 3% $H_2$ | 14 | 1250 |
| 8 | 800 | $N_2$ containing 7% $H_2$ | 5 | 1250 |
| 9 | 800 | $N_2$ containing 3% $H_2$ | 14 | 1200 |
| 10 | 800 | $N_2$ containing 7% $H_2$ | 5 | 1250 |
| 11 | 800 | Air | 3 | 1300 |
| 12 | 800 | Air | 3 | 1250 |
| 13 | 800 | Air | 3 | 1200 |
| 14 | 800 | Air | 3 | 1200 |

The resistivities, the value of corrosion resistances and the number of repetitions of "heating and cooling" of the sintered bodies (Electrodes Nos. 7-14) are shown in Table 2.3.

Table 2.3

| Sample No. | Resistivity (Ω·cm) | Corrosion loss (mg/dm$^2$) | Number of repetition of heating and cooling |
|---|---|---|---|
| 7 | 0.008 | 1.20 | 205 |
| 8 | 0.007 | 1.15 | 252 |
| 9 | 0.010 | 1.20 | 231 |
| 10 | 0.009 | 1.20 | 207 |
| 11 | 0.250 | 1.00 | 245 |
| 12 | 0.330 | 1.20 | 273 |
| 13 | 0.450 | 1.20 | 298 |
| 14 | 0.470 | 1.25 | 243 |

From the results as shown above, it is understood that electrodes for use in cathodic protection having a low resistivity, a high corrosion resistance and a high thermal shock resistance can be obtained from a sintered body of a mixture of iron oxide of 90 to 55 mol % in terms of $Fe_2O_3$ and metal oxide of 10 to 45 mol % in terms of MO, wherein M is at least one metal selected from the group consisting of Mn, Ni, Co, Cu and Zn.

Additional tests were carried out as follows:

Electrodes Nos. 2-6 having dimension of 120 mm × 10 mm were prepared by repeating the procedures as shown in Samples 2-6 of Example 1, and thermal shock tests of Electrodes Nos. 2-6 and corrosion tests of Electrodes No. 2 were carried out as follows:

1. Thermal shock tests:

Electrodes Nos. 2-6 were dipped in an iron vessel provided with an electric heater. Cold water at a temperature of 5° C. was poured into the vessel over a period of 6 minutes and then the cold water was heated by energizing the electric heater for 30 minutes. The temperature of the water reached 98° C. After the energizing was stopped, the hot water was drained off from the vessel over 4 minutes and cold water at a temperature of 5° C. was poured again into the vessel over a period of 6 minutes. The second energizing was begun. The heating and cooling of the electrodes as above was repeated 1050 times by an automatic controller. The breakage of Electrodes Nos. 2-6 could not be detected.

2. Corrosion tests:

Electrode No. 2 was set in a vessel (enamelled ironware) containing hot water. The tests were carried out under the following conditions:

| Anode | Electrode No. 2. |
|---|---|
| Cathode | Nickel plate |
| Voltage (D.C.) | 5V |
| Current density | 0.5 Amp/dm$^2$ |
| Temperature of water | 98° C. |

The energizing was continued for 8 hours and 7 days; the concentration of iron ion in the water was 0.007 ppm (for 8 hours) and 0.15 ppm (for 7 days), respectively. These values are less than that of the Standard of the Food Sanitation Law (Fe ion 0.3 ppm). The electrode of this invention can be used as an anode for a water heater (kettle) for drinking purposes.

What is claimed is:

1. In a process for prevention of corrosion of metal structures wherein an electric current is passed between an anode and the metal structure, the improvement which comprises using as said anode a sintered body comprised of a mixture of iron oxide of 90 to 55 mol % in terms of $Fe_2O_3$ and a metal oxide of 10 to 45 mol % in terms of MO, wherein M is at least one metal selected from the group consisting of Mn, Ni, Co, Cu and Zn.

2. A process according to claim 1 wherein said sintered body is prepared by heating a shaped body at a temperature varying between 1100° C. and 1450° C.

3. A process according to claim 1 wherein said mixture comprises $Fe_2O_3$ and NiO.

4. A process according to claim 3 wherein the mol % of $Fe_2O_3$ to NiO varies from about 90:10 to about 55:45.

5. A process according to claim 3 wherein the mol % of $Fe_2O_3$ to NiO is about 60:40.

6. A process according to claim 1 wherein said mixture comprises $Fe_2O_3$ and CoO.

7. A process according to claim 6 wherein the mol % of $Fe_2O_3$ to CoO to about 90:10.

8. A process according to claim 1 wherein said mixture comprises $Fe_2O_3$, MnO, CoO and ZnO.

9. A process according to claim 8 wherein said mixture comprises 60 mol % $Fe_2O_3$, 10 mol % MnO, 15 mol % CoO and 15 mol % ZnO.

10. A process according to claim 1 wherein said mixture comprises $Fe_2O_3$, MnO, CuO and NiO.

11. A process according to claim 10 wherein said mixture comprises 60 mol % $Fe_2O_3$, 10 mol % MnO, 10 mol % CuO and 20 mol % NiO.

12. A process according to claim 1 wherein said sintered body is a solid solution of (1) $MFe_2O_4$ wherein M is at least one metal selected from the group consisting of Mn, Ni, Co, Cu and Zn of 15.79 to 87.1 mol % and (2) $Fe_3O_4$ of 84.21 to 12.9 mol %.

* * * * *

UNITED STATES PATENT AND TRADEMARK OFFICE
CERTIFICATE OF CORRECTION

PATENT NO. : 4,169,028
DATED : September 25, 1979
INVENTOR(S) : Isao Yokoyama, et al It is certified that error appears in the above—identified patent and that said Letters Patent is hereby corrected as shown below:

In the title page, under "Inventors", line 2: "Nikako" should be --Nikaho--.

Column 1, line 28: "ground" should be --found--.

Column 4, line 30: "Electrodes" should be --Electrode--.

Column 5, line 16: "to" (2nd occurrence) should be --is--.

Signed and Sealed this

Twenty-second Day of April 1980

[SEAL]

Attest:

SIDNEY A. DIAMOND

Attesting Officer     Commissioner of Patents and Trademarks